United States Patent
Sharobim (10) Patent No.: US 8,504,088 B2
(45) Date of Patent: *Aug. 6, 2013

(54) METHOD AND SYSTEM FOR DISTRIBUTED DISTANCE-BASED PAGING

(75) Inventor: Hadi Sharobim, Kanata (CA)

(73) Assignee: Ericsson AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/156,516

(22) Filed: Jun. 9, 2011

(65) Prior Publication Data
US 2011/0244910 A1 Oct. 6, 2011

Related U.S. Application Data (63) Continuation of application No. 11/465,134, filed on Aug. 17, 2006, now Pat. No. 7,979,081.

(60) Provisional application No. 60/710,215, filed on Aug. 22, 2005.

(51) Int. Cl.
| | |
|---|---|
| *H04B 7/00* | (2006.01) |
| *H04W 68/00* | (2009.01) |
| *H04W 40/00* | (2009.01) |
| *H04W 4/00* | (2009.01) |
| *H04M 3/42* | (2006.01) |

(52) U.S. Cl.
USPC ........ 455/515; 455/458; 455/446; 455/426.1; 455/414.1; 370/331

(58) Field of Classification Search
USPC ....................................................... 455/515
See application file for complete search history.

(56) References Cited

U.S. PATENT DOCUMENTS
| | | | |
|---|---|---|---|
| 2002/0086685 A1* | 7/2002 | Wallentin et al. | 455/458 |
| 2004/0043774 A1 | 3/2004 | Lee | |
| 2004/0179492 A1 | 9/2004 | Zhang | |
| 2006/0276207 A1 | 12/2006 | Harris | |

FOREIGN PATENT DOCUMENTS
WO 2006/079210 A1 8/2006

OTHER PUBLICATIONS
Suman Das, et al., "Distributed Paging and Registration in Wireless Networks", IEEE Network, Sep. 2005, pp. 19-25.

* cited by examiner

*Primary Examiner* — Timothy Pham
(74) *Attorney, Agent, or Firm* — Potomac Patent Group, PLLC (57) ABSTRACT

A distance-based paging system distributes the decision as to which base stations should send a page to a terminal. The Radio Network Controller (RNC) simply stores the location information and paging range (e.g., the route update radius) of the reference sector for each terminal. When a page message needs to be sent to the terminal, the RNC sends the location information and paging range to each base station in a broadcast or a multicast message that includes the location coordinates and route update radius of the reference sector in the message header, and the information to be sent in the over the air page in the message payload. Each base station determines whether one or more of its sectors is located within the paging area, and broadcasts a page based on the payload of the message to the terminal if it is within the paging area or discards the paging message if it is not.

26 Claims, 4 Drawing Sheets

METHOD AND SYSTEM FOR DISTRIBUTED DISTANCE-BASED PAGING

CROSS REFERENCE TO RELATED APPLICATIONS

This application claims the benefit of priority of U.S. Provisional Patent Application No. 60/710,215 filed Aug. 22, 2005, the contents of which are incorporated herein by reference in their entirety.

FIELD OF THE INVENTION

The present invention relates generally to wireless networks. More particularly, the present invention relates to paging mobile terminals in wireless networks.

BACKGROUND OF THE INVENTION

Typically a wireless network (or at least each subnet of such a network) comprises a network facility, for example a Radio Network Controller (RNC), connected via a "back haul" network to a plurality of Base Stations (BTS). Each BTS communicates with terminals located in a cell centered at the BTS antenna via a wireless interface, such as IS95, IS2000 and 1xEV-DO. Typically each cell is divided into 3 sectors, each covered by a directional antenna and controlled by a Radio Network (RN) card within the BTS.

As many wireless terminals are mobile, the wireless network will not always know in which sector a terminal is located at any given time. Normally, the terminal informs the network of a change in its location only when it moves from one subnet (a relatively large geographical zone covering many sectors) to another subnet. Although it would be technically possible for the terminal to inform the network every time it moves between sectors, this is not practical, because the frequency of such updates would consume a large amount of processing and message transmission resources. Instead, in the past, wireless networks attempt to locate a mobile terminal only when there is traffic to send to the terminal, by "paging" the terminal in all the sectors of the subnet.

In order to better utilize the network resources, prior art methods have proposed paging a terminal only in the sector from which it had last transmitted a message to the network, and the surrounding sectors. Furthermore, to account for mobility, the prior art methods have proposed that the terminal sends location update messages (typically called Route Update (RU) messages) to the network to inform the network of its location after the terminal has moved a defined distance, or after it crosses a defined boundary. In either case, the terminal's location is considered to be the location (for example, the geographical coordinates) of a reference sector. The Reference sector is the sector with which the AT or terminal has registered, or to which the terminal last sent a RU message. Typically pages are sent to surrounding sectors to that lie within a defined distance from the reference sector. This distance is often called the RouteUpdateRadius (RUR). This distance defines the distance the terminal can move before the terminal needs to send its location update (RU). In other words, distance-based paging reduces the paging area by restricting paging to only a paging area determined by the RUR.

In such systems, the RNC typically determines which sectors (i.e., which RNs) should broadcast a page, based on their location, as well as the location of the serving/reference sector and the RUR for each terminal. The RNC then only sends paging messages to those RNs, which in turn broadcast the page over the wireless interface to the terminal. As stated, this conserves the wireless resources by restricting the broadcasting of paging messages to sectors in which the terminal is likely to be located.

However, such a described system adds to the processing burden of the RNC, which must now continuously determine the paging area for every terminal. The RNC must compute for each AT, which sectors in the subnet are within the paging area (defined by reference sector geographical coordinates, RUR and each and every sector's geographical coordinates). This would have to be done every time a RU message is received or each time a sector is added to or removed from the network. This increases the load on the RNC. Furthermore, this additional complexity presents challenges to scalability for a large network with large number of sectors and to a distributed network architecture or flat architecture.

It is, therefore, desirable to provide a distance-based paging mechanism that reduces the processing load on the RNC.

SUMMARY OF THE INVENTION

Accordingly, there is provided a distributed distance-based paging system, which distributes the processing burden to the base stations. Accordingly, rather than have the RNC determine the paging area for every terminal, the system distributes the decision whether a BTS should page a terminal to the BTS.

In a first aspect, the present invention provides a method of distance-based paging a terminal in a communication network, comprising: at a network facility: distributing location information and paging range for at least one reference sector within communication range of said terminal to all base stations; and at each base station: determining whether a sector associated with said base station is within said paging range of said reference sector; and responsive to said determining step, broadcasting a page directed to said terminal if said sector is within said paging range for said at least one reference. These steps can be repeated steps for each sector in an active set associated with a terminal to be paged.

The network facility, for example a RNC, does not need to determine which base stations should send a page and which ones should not. It simply stores the location information and paging range (for example, a route update radius) of the reference sector for each terminal. When a page message needs to be sent to the terminal the RNC sends the location information and paging range to each base station. According to an embodiment of the invention, this is done by a broadcast or a multicast message that includes the location coordinates and route update radius of the reference sector in the header of the message. The payload of the message includes the information to be sent in the over the air page. Each base station determines whether one or more of its sectors are located within the paging area, e.g., within a distance defined by the route update radius from the coordinates of the reference sector. Each base station makes this determination and broadcasts a page based on the payload of the message to the terminal if it is within the paging area and discards the paging message if it is not.

In a further embodiment, there is provided a computer readable medium storing computer executable instructions which, when executed by a processor of a base station in a wireless network causes said base station to: (a) Responsive to receiving a page message from a network facility, determine whether a sector associated with said base station is within a specified paging range; and (b) responsive to (a), broadcast a page directed to a terminal if said sector is within said paging range.

In further aspect, the present invention provides a computer readable medium storing computer executable instruction which, when executed by a processor of a network facility in a wireless network causes said network facility to: (a) generate a paging message for a terminal, said paging message including an indication of the location of at least one reference sector, and a paging range for said reference sector; and (b) send said paging message to a plurality of all base stations controlled by said network facility.

In a further aspect of the invention provides a method of distance-based paging a terminal in a communication network, comprising: determining location information and paging range for at least one reference sector within communication range of said terminal; determining whether a sector is within said paging range for said reference sector; and responsive to said determining step, broadcasting a page directed to said terminal if said sector is within said paging range for said at least one reference sector.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for distributing the decision making process for determining which base stations should page a given terminal.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. For example, specific details are not provided as to whether the embodiments of the invention described herein are implemented as a software routine, hardware circuit, firmware, or a combination thereof.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

In this specification we will describe embodiments of the invention in relation to an exemplary wireless network, however it should be noted that the invention is applicable to IS95, IS2000, 1xEV-DO and any standard that uses distance-based paging.

A table listing some acronyms used in this specification follows:

| | |
|---|---|
| BTS | Base Station |
| RNC: | Radio Network Controller |
| x_ref: | reference sector longitude |
| y_ref: | reference sector latitude |
| r_ref: | reference sector RUR |
| RU: | RouteUpdate message |
| AN: | Access Network |
| AT: | Access Terminal |
| RN: | Radio Network (RN) |
| RUR: | Route Update Radius |

Figure 1:
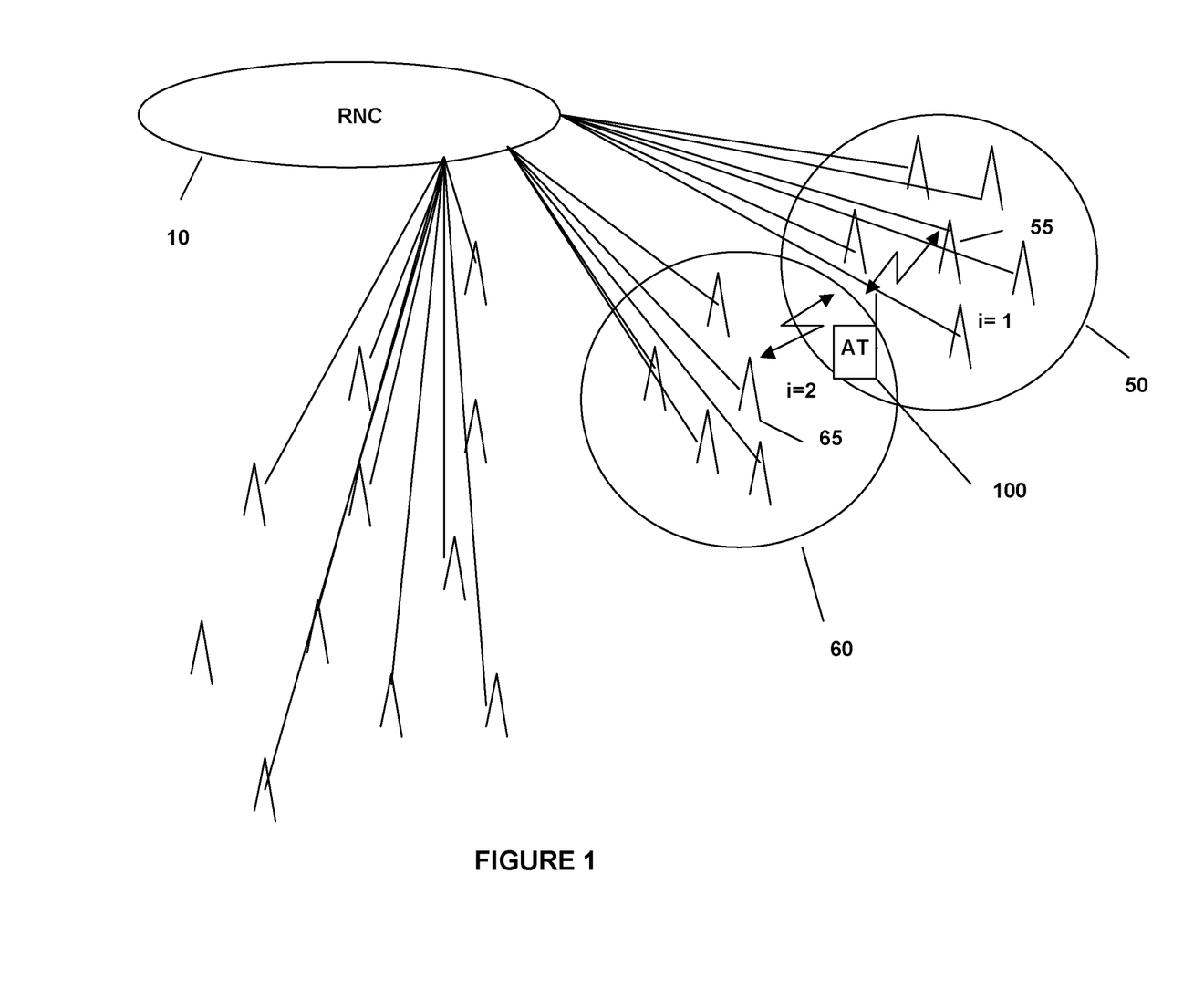
FIG. 1 is a schematic drawing illustrating an exemplary wireless network consistent with an embodiment of the invention.

FIG. 1 is a schematic diagram illustrating a wireless network in accordance with the principles of the invention. FIG. 1 illustrates a network facility, for example RNC 10, an access terminal 100, and a plurality of base stations including base stations 55 and 65 in the center of circles 50 and 60 respectfully. The circle 50 represents a paging area centered at a sector associated with base station 55 with a route update radius equal to the distance between the BTS 55 and the circumference of the circle 50. Terminal 100 is shown to be in communication with base station 55 using pilot channel i=1.

According to an embodiment of the invention, when RNC 10 determines a page needs to be sent to terminal 100, it broadcasts a paging message to all base stations. Such a message distributes the location and paging range of a sector of BTS 55, which is serving terminal 100 to all base stations. Typically the location comprises coordinates for the reference sector and paging range comprises a route update radius for the reference sector. Each base station would determine whether one of its sectors is within said paging range of said location, and if so, it broadcasts a page directed to the terminal. Otherwise the base station will ignore the paging message sent by the RNC 10. In this example, all base stations within circle 50 will send a page directed to terminal 100 as each of the base stations within a circle 50 are within the paging range (as they are within circle bounded by the route update radius centered at the coordinates of base station 55).

Distance-based paging reduces the paging area from the entire subnet to a paging area determined by a paging range, for example, a route update radius. Each sector broadcasts a route update radius and coordinates associated with this sector (for example the geographic coordinates). When a mobile moves beyond the route update radius from the coordinates of a reference sector, it sends a route update message to the network. It should be noted that the RU message is specific to the 1xEV-DO standard. However, other distance-based messages can of course be used for other standards.

The RNC does not need to determine which base stations should send a page and which ones should not. It simply stores the location information and route update radius of the reference sector for each terminal. When a page message needs to be sent to the terminal the RNC sends the location information and paging range to each base station. According to an embodiment of the invention, this is done by a broadcast or a multicast message, which includes the location coordinates and route update radius of the reference sector in the header of the message. The payload of the message includes the information to be sent in the over the air page. Each base station determines whether one or more of its sectors are located within the paging area, i.e. within a distance defined by the route update radius from the coordinates of the reference sector. Each base station makes this determination and broadcasts a page based on the payload of the message to the terminal if it is within the paging area and discards the paging message if it is not.

In this approach the reference sector is determined from the last RU message received from the terminal. If the mobile moves by more than the route update radius the terminal sends an RU message indicating it has moved outside the route update radius area. The reference sector is then changed to a sector where the RU message is received.

Figure 2:
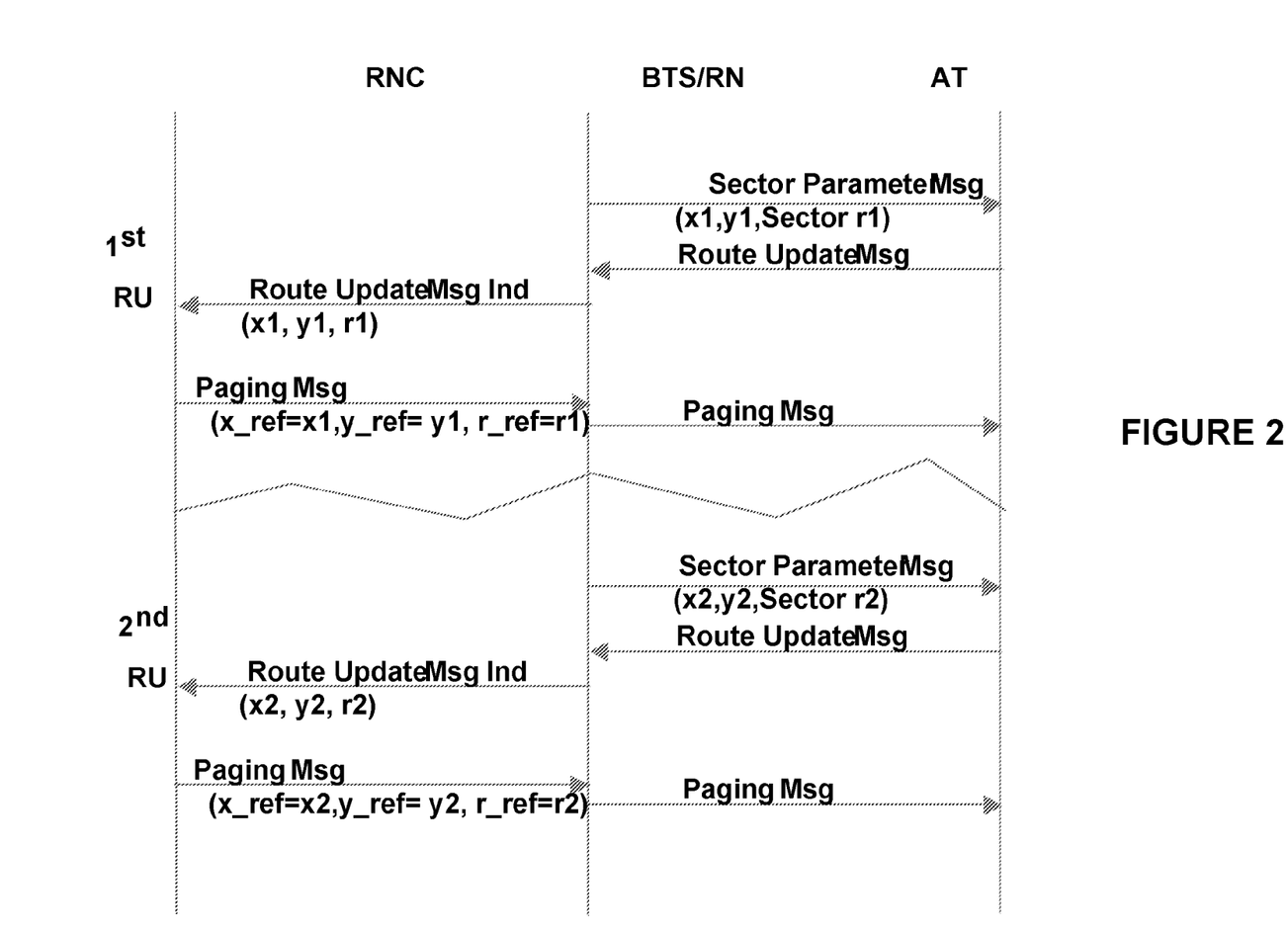
FIG. 2 is a message flow diagram that illustrates messages flows between network elements, and also lists method steps, according to an embodiment of the invention.

FIG. 2 is a message flow diagram that illustrates messages flows between network elements, and also lists method steps, according to an embodiment of the invention. FIG. 2 illustrates the message flows prior to and introducing a 1st and 2nd RU.

Each base station broadcasts a sector parameter message advising terminals of its location coordinates and paging range, for example, coordinates X1, Y1 and sector route update radius R1. The terminal sends a route update message to the base station in response to the terminal receiving the sector parameter message after the terminal moves beyond the previously established route update radius.

When a BTS receives the route update message from the terminal, the base station sends a route update indication message to the RNC advising the RNC that the terminal has sent a route update message to the base station sector. Depending on implementation, the BTS can create a new route update indication message i which includes the X, Y, and RUR for the sector. Alternatively, if the network is pre-provisioned so that the RNC is already aware of the X, Y and RUR for every sector, then this route update indication message can simply include the RU message that the BTS received from the terminal and forwards to the RNC. The RNC will store the X1, Y1 and route update radius R1 data for the reference sector for the terminal in question.

In the event that a paging message is required to be sent to the terminal, the RNC generates a paging message, which is sent to every base station. This paging message includes in its header the X1, Y1 coordinates and route update radius R1 that the RNC has stored for this terminal. Each base station receives this paging message from the RNC, and then determines whether any of its sectors are within the route update radius R1 of the reference sector X1, Y1. For example, in one embodiment it calculates the distance from its sector location (X, Y) to the reference coordinates (X1, Y1). It then compares this distance with the route update radius. If this distance is less than or equal to the route update radius then the BTS sends the paging message to the access terminal as shown, as this sector is within the circle or paging range. Otherwise, this message is not forwarded, and the base station discards the message.

In another example, the base station simply determines the coordinates of one of its sectors is within the region formed by the circle with radius equal to the route update radius centered at the coordinates for the reference sector (e.g., X1, Y1). If one of the current sectors is within the circle and the page is sent over air. Otherwise the page is discarded.

FIG. 2 illustrates a terminal moving and sending a second route update message notifying the RNC to change the reference sector to X2, Y2 with route update radius R2 for the second route update message.

Figure 3:
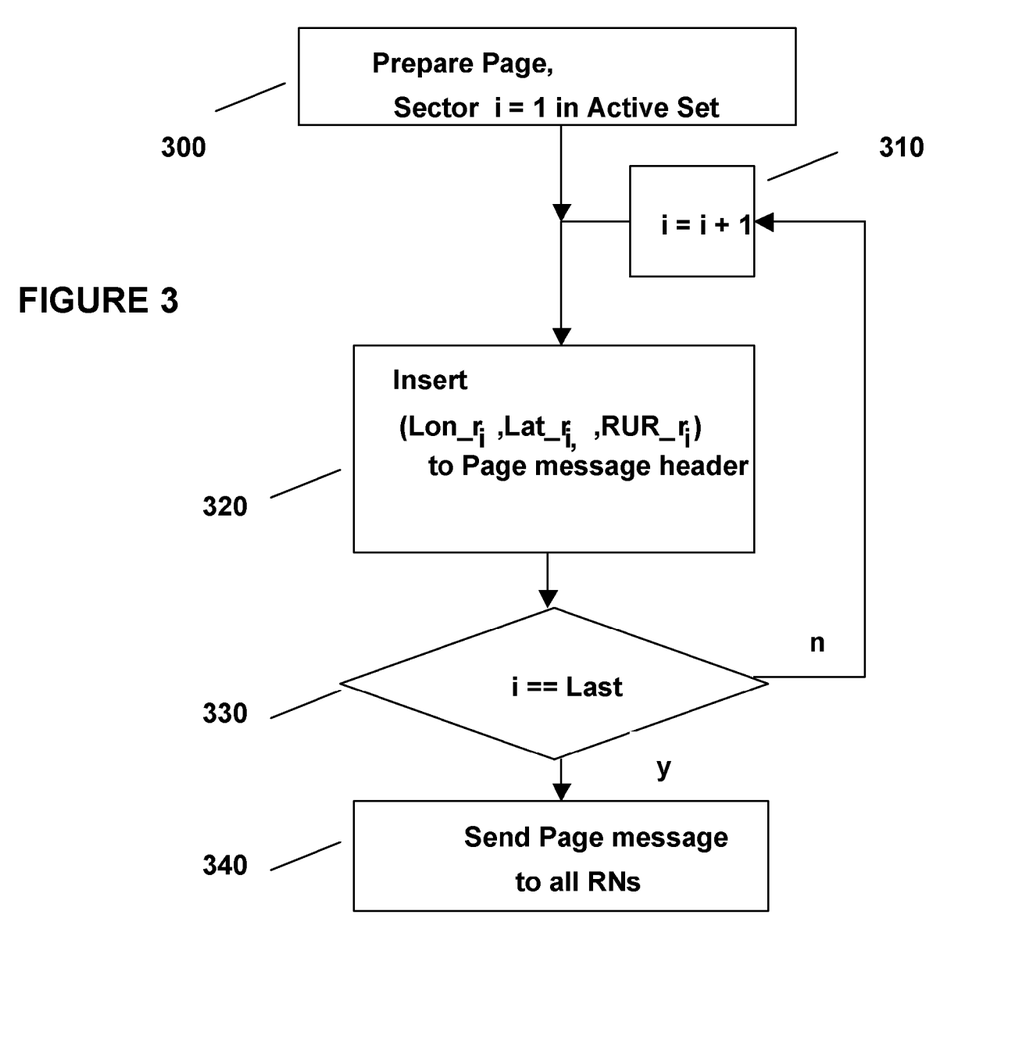
FIG. 3 is a flowchart illustrating the method executed at the RNC for multiple pilots, according to an embodiment of the invention.
Figure 4:
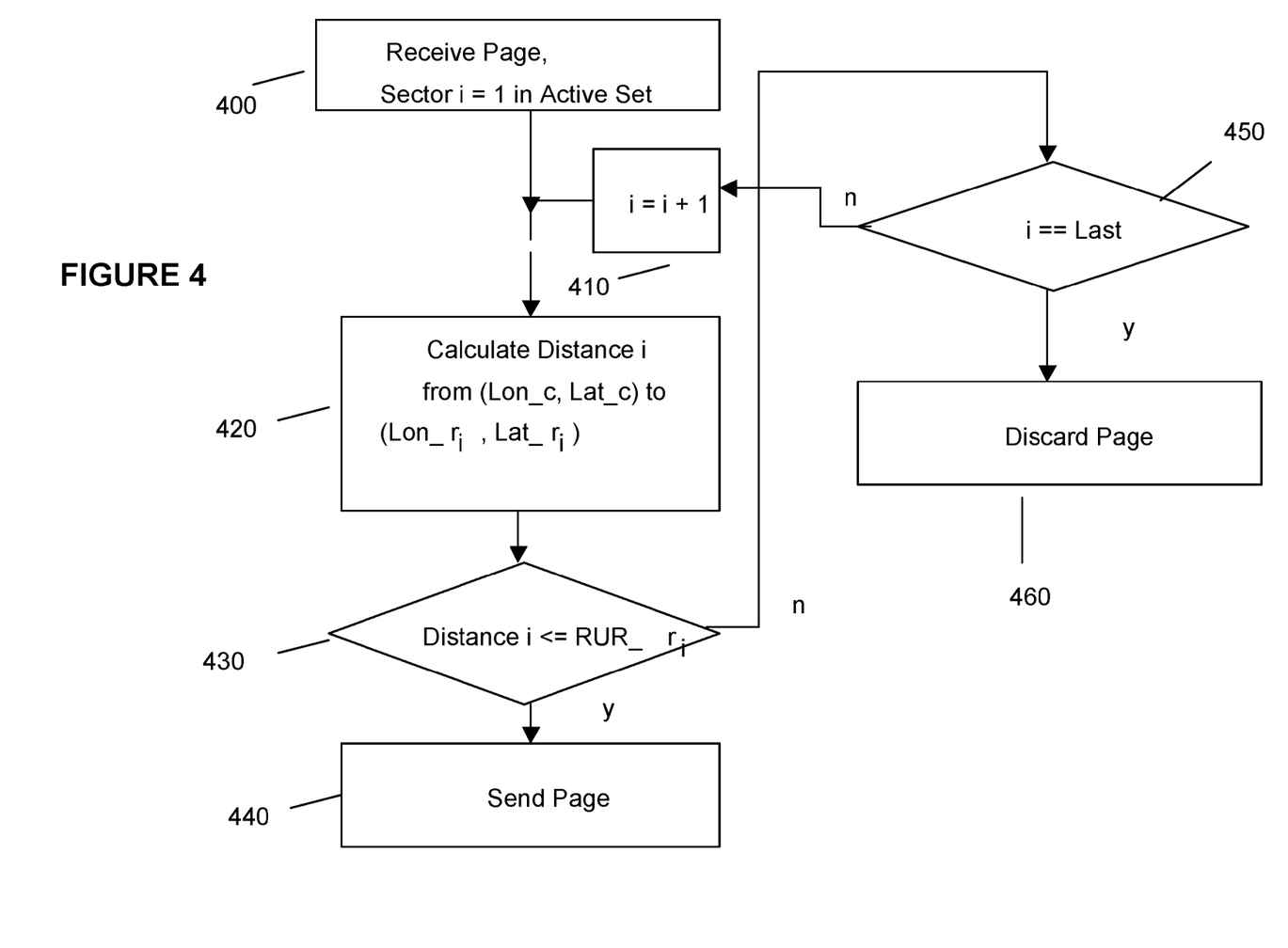
FIG. 4 is a flowchart illustrating the method executed at a RN for multiple pilots, according to an embodiment of the invention.

The above examples have been discussing sending a paging message based on the location of a single reference sector. However, an access terminal may receive pilot signals from more than one sector antenna, which may be from more than one base station. The messaging system can be generalized such that the RNC stores the coordinates and the route update radius for each sector from which the terminal sees the pilot. The RNC than sends the coordinates and route update radius for each of these sectors in the header of its broadcast paging message. Accordingly, each base station determines whether any of its sectors are within range of any of the pilot sectors. FIGS. 3 and 4 are flowcharts that show exemplary algorithms at the RNC and RN respectfully.

FIG. 3 is a flowchart illustrating the method executed by a CPU of an RNC for multiple pilots, according to an embodiment of the invention. The RNC prepares a page that includes an indication of the location and paging range for each sector in the active set associated with the terminal 300. The variable i represents each sector in the active set. Initially i=1 for the first sector in the active set. The RNC then inserts the coordinates (the longitude reference $Lon\_r_i$, the latitude reference $Lat\_r_i$, and route update radius for the reference sector $RUR\_r_i$) into the page message header 320. It then determines whether i equals the last number in the active set 330. If yes than the RNC sends the page message to all RN 340. If not, the RNC increments i to the next value in the active set 310 and continues inserting the location information and route update radius for each sector in the active set.

FIG. 4 shows a similar algorithm at each RN. The RN is a Radio Network card within a BTS. When the RN receives a page broadcast message 400, i is initially set to one. It then calculates the distance i from itself to the sector i. In this example it determines the distance from its longitude and latitude coordinates (Lon_c, Lat_c) to the coordinates of reference sector i ($Lon\_r_i$, that $Lat\_r_i$) 420. If this distance is less than the route update radius $RUR\_R_i$ 430 it sends the page to the terminal over the air interface 440. If not, the RN determines whether i represents the last sector in the active set 450. If yes, it discards the page 460. Otherwise, it increments i to the next value of the active set 410 and continues calculating this distance 420.

In this manner the total paging area corresponds to the union of the circles of the pilots in the active set, with the circle for each pilot representing a circle centered at the X and Y coordinates of the sector for that pilot with a radius equal to the route update radius of that pilot sector. For example, FIG. 1 also illustrates an example of a terminal adding a second pilot to its active set, with a paging area for each pilot. In this figure, AT 100 is in communication with a sector of BTS 55 (i.e., it is active). We label i=1 a pilot channel associated with that communication. As AT 100 moves it sees a strong pilot i=2 originating from BTS 65. In response, the AT 100 sends a RU message to the network requesting the network add pilot i=2 to its active set—so terminal 100 sees pilot 1 from BTS 55 and pilot 2 from BTS 65. In this case, the terminal is in soft handoff, and the paging area corresponds to the union of the circles 50 and 60. Consequently, all base stations within both $RUR\_r_1$ (circle 50) and $RUR\_r_2$ (circle 60) will send subsequent pages over the air interface.

As stated, as a mobile moves it may see a strong pilot from another sector. In which case it determines whether the pilot from this new sector has a quality (signal to noise ratio, bit error rate, or some other indication) greater than a threshold. If so, the mobile issues an RU, sending the PN offsets and signal strengths for all of the pilots it sees and requests addition of this new pilot to its active set. The RNC uses this information to maintain an active set of sectors, which represent a paging range that is most likely to include the terminal at any given moment in time. This will be thought of as an implicit registration. For implicit registration the terminal does not actually register with each sector in its active set. Rather, whenever messages are sent to and from the mobile and the network, the network learns about the current location of the mobile. In one embodiment whenever a mobile responds to a page, or requests a sector be added to its active set the base station can consider this to be a route update message and send such a message to the RNC.

Note according to an embodiment of the invention, the paging range can be modified by a selectable adjustment factor in circumstances where the operator of the network desires to adjust the paging range for a sector or cell. Thus the paging range can be, for example, the RUR plus some fixed constant. An example of modifying a paging range by a selectable adjustment factor is described in more detail in the PCT Application No. CA2006/000106, filed Jan. 27, 2006, which is hereby incorporated by reference.

The above-described embodiments of the present invention are intended to be examples only. Those of skill in the art may effect alterations, modifications and variations to the particular embodiments without departing from the scope of the invention, which is defined solely by the claims appended hereto.

What is claimed is:

1. A method of distance-based paging a terminal in a communication network having a plurality of base stations at a plurality of locations, comprising:
   at a network facility:
      distributing location information and paging range for at least one reference sector within communication range of said terminal to said plurality of base stations;
   at each of said plurality of base stations:
      determining whether a first sector associated with a first base station is within said paging range of said at least one reference sector;
      responsive to said determining step, sending a first page directed to said terminal if said first sector is within said paging range for said at least one reference sector;
      determining whether a second sector associated with a second base station is within said paging range of said at least one reference sector; and
      responsive to said determining step, sending a second page from said first base station and said second base station directed to said terminal, wherein said first and second sectors are within said paging range for said at least one reference sector,
   wherein said location information comprises co-ordinates for said at least one reference sector which is serving said terminal, and
   wherein said paging range comprises a Route Update Radius (RUR) for said at least one reference sector.

2. The method as claimed in claim 1, further comprising repeating said steps for each sector in an active set associated with said terminal.

3. The method as claimed in claim 1 wherein said distributing step comprises:
   generating a paging message for said terminal, said paging message including an indication of the location of said at least one reference sector, and a paging range for said at least one reference sector; and
   sending said paging message to a plurality of all base stations controlled by said network facility.

4. The method of claim 3, wherein said sending step comprises sending said paging message in the form of a multicast or broadcast message.

5. The method as claimed in claim 3 wherein said paging message includes a header and payload, and wherein said location and paging range are located within the header, and the payload includes contents of the page to be sent to the terminal.

6. The method as claimed in claim 5, wherein said network facility maintains an active set of all sectors which the terminal reports are within communication range, and wherein said paging message comprises the location and paging range of each sector within said active set.

7. The method according to claim 3, further comprising:
   sending a first Route Update (RU) requesting addition of each of said sectors associated with said first base station and said second base station to an active set of sectors associated with the terminal.

8. The method of claim 1 wherein the paging range is modified by a selectable adjustment factor.

9. The method of claim 1 wherein paging range comprises the Route Update Radius for said at least one reference sector modified by a selectable adjustment factor.

10. The method as claimed in claim 1, wherein each of said determining steps comprise determining whether co-ordinates associated with said first and second sectors are within said RUR from said at least one reference sector.

11. The method as claimed in claim 1, wherein each of said determining steps comprise calculating the distance between co-ordinates associated with said first and second sectors and the co-ordinates for said at least one reference sector, and determining whether said distance is less than said RUR.

12. A non-transitory computer readable medium storing computer executable instructions which, when executed by a processor of a base station in a wireless network having a plurality of base stations at a plurality of locations causes each base station of said plurality of base stations to be:
   (a) responsive to receiving a page message from a network facility, said page message being sent to said plurality of base stations and comprising location information and paging range of at least one reference sector within communication range of a terminal, determine whether a sector associated with said base station is within a specified paging range; and
   (b) responsive to (a), sends a page directed to a terminal if said sector is within said paging range,
   wherein said location information comprises co-ordinates for said at least one reference sector which is serving said terminal; and
   wherein said paging range comprises a Route Update Radius (RUR) for said at least one reference sector;
   further wherein a first sector is associated with a first base station, wherein said first base station sends a first page, and
   wherein a second sector is associated with a second base station, wherein said first base station and said second base station sends a second page.

13. A computer readable medium as claimed in claim 12, wherein said computer executable instructions comprise instructions to make the determination specified in (a) by determining whether co-ordinates associated with said sector are within said specified range from said at least one reference sector.

14. A computer readable medium as claimed in claim 12 wherein said network facility maintains an active set of all sectors which the terminal reports are within communication range, and wherein said paging message comprises the location and paging range of each sector within said active set, and wherein said computer executable instructions comprise instructions to repeat the determination specified in (a) by determining whether co-ordinates associated with said sector are within the paging range of any sector within said active set.

15. A non-transitory computer readable medium storing computer executable instructions which, when executed by a processor of a network facility in a wireless network causes said network facility to:
   (a) generate a paging message for a terminal, said paging message including an indication of the location of at least one reference sector, and a paging range for said at least one reference sector; and
   (b) send said paging message to a plurality of all base stations controlled by said network facility,
   wherein said indication of the location comprises co-ordinates for said at least one reference sector which is serving said terminal; and
   wherein said paging range comprises a Route Update Radius (RUR) for said at least one reference sector;
   further wherein a first sector is associated with a first base station, wherein said first base station sends a first paging message, and
   wherein a second sector is associated with a second base station, wherein said first base station and said second base station send a second paging message.

16. A computer readable medium as claimed in claim 15 wherein said computer executable instructions further comprising instructions to cause said network facility to repeat (a) and (b) for each sector in an active set associated with said terminal.

17. A computer readable medium as claimed in claim 15 wherein said computer executable instructions further comprising instructions to cause said network facility to send said paging message in the form of a multicast or broadcast message.

18. A computer readable medium as claimed in claim 15 wherein said paging message includes a header and payload, and wherein said location and paging range are located within the header, and the payload includes contents of the page to be sent to the terminal.

19. A computer readable medium as claimed in claim 18 wherein said header includes the location co-ordinates and route update radius for each sector in an active set associated with said terminal.

20. A method of distance-based paging a terminal in a communication network having a plurality of base stations at a plurality of locations, comprising:
   determining location information and paging range for at least one reference sector within communication range of said terminal;
   distributing said location information and paging range to said plurality of base stations;
   determining whether a sector is within said paging range for said at least one reference sector; and
   responsive to said determining step, sending a page directed to said terminal if said sector is within said paging range for said at least one reference sector,
   wherein said location information comprises co-ordinates for said at least one reference sector which is serving said terminal; and
   wherein said paging range comprises a Route Update Radius (RUR) for said at least one reference sector,
   further wherein a first sector is associated with a first base station, wherein said first base station sends a first paging message, and
   wherein a second sector is associated with a second base station, wherein said first base station and said second base station send a second paging message.

21. A method of a terminal in a communication network having a plurality of base stations at a plurality of locations within a communication range of said terminal, comprising:
   receiving a sector parameter message from each of said plurality of base stations, said sector parameter message including location information and paging range for each of said plurality of base stations and defining a sector associated with t-he-each of said plurality of base stations;
   communicating with each of said plurality of base stations;
   receiving a paging message from a base station after each of said plurality of base stations determine that said sector associated with the base station is within a paging range of a at least one reference sector of the terminal,
   wherein said location information comprises co-ordinates for said at least one reference sector,
   further wherein said paging range comprises a Route Update Radius (RUR) for said at least one reference sector,
   further wherein a first sector is associated with a first base station, wherein said first base station sends a first paging message, and
   wherein a second sector is associated with a second base station, wherein said first base station and said second base station send a second paging message.

22. The method of claim 21, wherein the receiving of the paging message comprises receiving the paging message from said base station after the base station determines that co-ordinates for said sector associated with the base station are within the RUR of the co-ordinates for said at least one reference sector.

23. The method of claim 21, wherein said communicating comprises sending a Route Update (RU) message to each of said plurality of base stations.

24. The method of claim 21, further comprising responding to said paging message from said base station.

25. The method of claim 21, wherein said communicating comprises requesting a second sector be added to an active set maintained by a network facility.

26. A method of a terminal in a communication network, comprising:
   receiving a first sector parameter message from a first base station, said sector parameter message including location information and paging range for the first base station and defining a sector associated with the first base station;
   determining that the first sector parameter message has a quality greater than a predetermined threshold;
   sending a first Route Update (RU) requesting addition of the sector associated with the first base station to an active set of sectors associated with the terminal;
   receiving a first paging message from said first base station, the first base station having determined that said sector associated with the first base station is within a paging range of at least one reference sector of the terminal;

receiving a second sector parameter message from a second base station, said sector parameter message including location information and a paging range for the second base station and defining a sector associated with the second base station;
determining that the second sector parameter message has a quality greater than a predetermined threshold;
sending a second RU requesting addition of the sector associated with the second base station to the active set of sectors associated with the terminal; and
receiving a second paging message from said first base station and said second base station, the first and second base stations having determined that said sectors associated with the first and second base station are within a paging range of at least one reference sector of the terminal.

* * * * *

UNITED STATES PATENT AND TRADEMARK OFFICE
CERTIFICATE OF CORRECTION

PATENT NO. : 8,504,088 B2  Page 1 of 1
APPLICATION NO. : 13/156516
DATED : August 6, 2013
INVENTOR(S) : Sharobim It is certified that error appears in the above-identified patent and that said Letters Patent is hereby corrected as shown below:

In the Claims

In Column 8, Line 66, in Claim 13, delete "A computer" and insert -- The computer --, therefor.

In Column 9, Line 5, in Claim 14, delete "A computer" and insert -- The computer --, therefor.

In Column 9, Line 36, in Claim 16, delete "A computer" and insert -- The computer --, therefor.

In Column 9, Line 41, in Claim 17, delete "A computer" and insert -- The computer --, therefor.

In Column 9, Line 46, in Claim 18, delete "A computer" and insert -- The computer --, therefor.

In Column 9, Line 51, in Claim 19, delete "A computer" and insert -- The computer --, therefor.

In Column 10, Line 20, in Claim 21, delete "with t-he-each" and insert -- with each --, therefor.

Signed and Sealed this
Eighth Day of July, 2014

Michelle K. Lee
*Deputy Director of the United States Patent and Trademark Office*